US012003503B2

(12) United States Patent
Gahir et al.

(10) Patent No.: US 12,003,503 B2
(45) Date of Patent: Jun. 4, 2024

(54) MULTI-FACTOR AUTHENTICATION SYSTEM AND METHOD

(71) Applicant: Machine Two Ltd, London (GB)

(72) Inventors: Manjit Singh Gahir, London (GB); Ranjit Singh Gahir, London (GB); Goutam Shankar Lenka, Bhubaneswar (IN); Alexander John Lewer, London (GB); Mudasar Rauf, Hayes (GB)

(73) Assignee: Machine Two Ltd., London (GB)

(*) Notice: Subject to any disclaimer, the term of this patent is extended or adjusted under 35 U.S.C. 154(b) by 310 days.

(21) Appl. No.: 17/592,349

(22) Filed: Feb. 3, 2022

(65) Prior Publication Data
US 2022/0247738 A1 Aug. 4, 2022

(30) Foreign Application Priority Data
Feb. 4, 2021 (GB) .................................. 2101551

(51) Int. Cl.
*H04L 9/40* (2022.01)
(52) U.S. Cl.
CPC ........ *H04L 63/0853* (2013.01); *H04L 63/083* (2013.01)
(58) Field of Classification Search
CPC .......................... H04L 63/0853; H04L 63/083
USPC .......................................................... 726/7
See application file for complete search history.

(56) References Cited

U.S. PATENT DOCUMENTS 7,427,033 B1 * 9/2008 Roskind ................ G07F 7/1083
235/487
8,595,806 B1 * 11/2013 Gabrielson ........... G06F 21/629
709/227
9,154,486 B1 * 10/2015 Saylor ..................... E05B 65/52
9,294,476 B1 * 3/2016 Lurey ................. H04L 63/0838
9,979,723 B1 * 5/2018 Saylor ................... H04L 63/102
11,514,154 B1 * 11/2022 Tripathi .................. G06F 21/31
2007/0022301 A1 * 1/2007 Nicholson .......... G06Q 20/4014
713/184

(Continued)

OTHER PUBLICATIONS

Combined Search and Examination Report Under Sections 17 and 18(3) dated Nov. 4, 2021 in GB2101551.6 (10 pages).

(Continued)

*Primary Examiner* — Thanh T Le
(74) *Attorney, Agent, or Firm* — YOUNG LAW FIRM, P.C.

(57) ABSTRACT

Multi-factor authentication (MFA) on a computer configured for robotic process automation (RPA) using task-executing bot(s) includes, responsive to a log-in request from the task-executing bot to a gatekeeping first server, at the task-executing bot, responsive to receiving an MFA challenge from the first server, acquiring a time-dependent MFA security token from a code generating algorithm associated with a pre-authenticated security bot perceived by the first server to be at a different address than the task-executing bot, the security bot having undergone a one-time synchronization at set-up to support RPA during which an association is established between the security and task-executing bots such that the association validates the security bot as a secondary device within MFA to automate subsequent MFA and inserting the time-dependent MFA security token into a reply to the MFA challenge and sending the reply to the first server.

17 Claims, 1 Drawing Sheet

(56) References Cited

U.S. PATENT DOCUMENTS

| | | | | |
|---|---|---|---|---|
| 2011/0113476 A1* | 5/2011 | Moutarazak | ......... | H04W 12/06 |
| | | | | 726/6 |
| 2011/0130120 A1* | 6/2011 | Hoeksel | ............. | H04W 12/068 |
| | | | | 455/411 |
| 2019/0132229 A1* | 5/2019 | McCormack | ......... | H04W 12/12 |
| 2019/0141125 A1* | 5/2019 | Ogrinz | ................. | H04L 67/306 |
| 2019/0268317 A1* | 8/2019 | Haelion | ............. | H04L 63/0435 |
| 2020/0065334 A1* | 2/2020 | Rodriguez | .............. | G06F 40/35 |
| 2020/0259827 A1* | 8/2020 | Shaffer | .................... | G06F 8/61 |

OTHER PUBLICATIONS

Extended European Search Report dated Jun. 10, 2022 in EPO Appln 22155153.4 (7 pages).

\* cited by examiner

FIG. 1: prior art
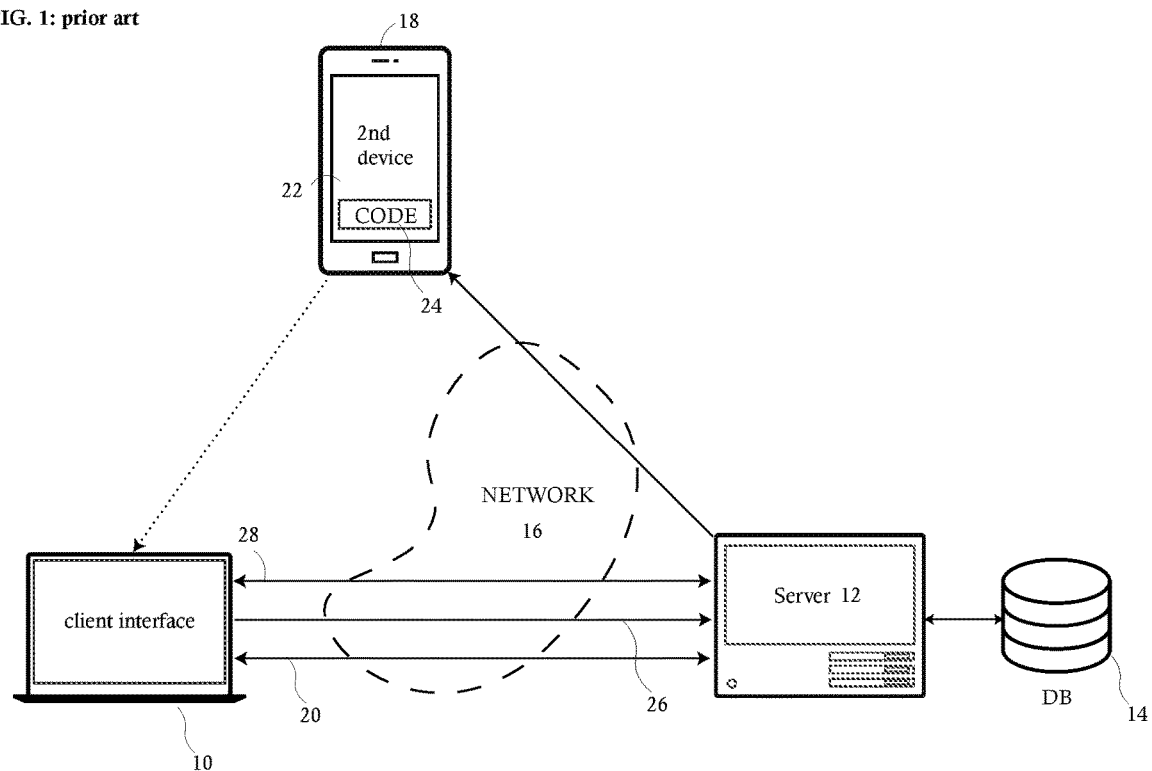
FIG. 2
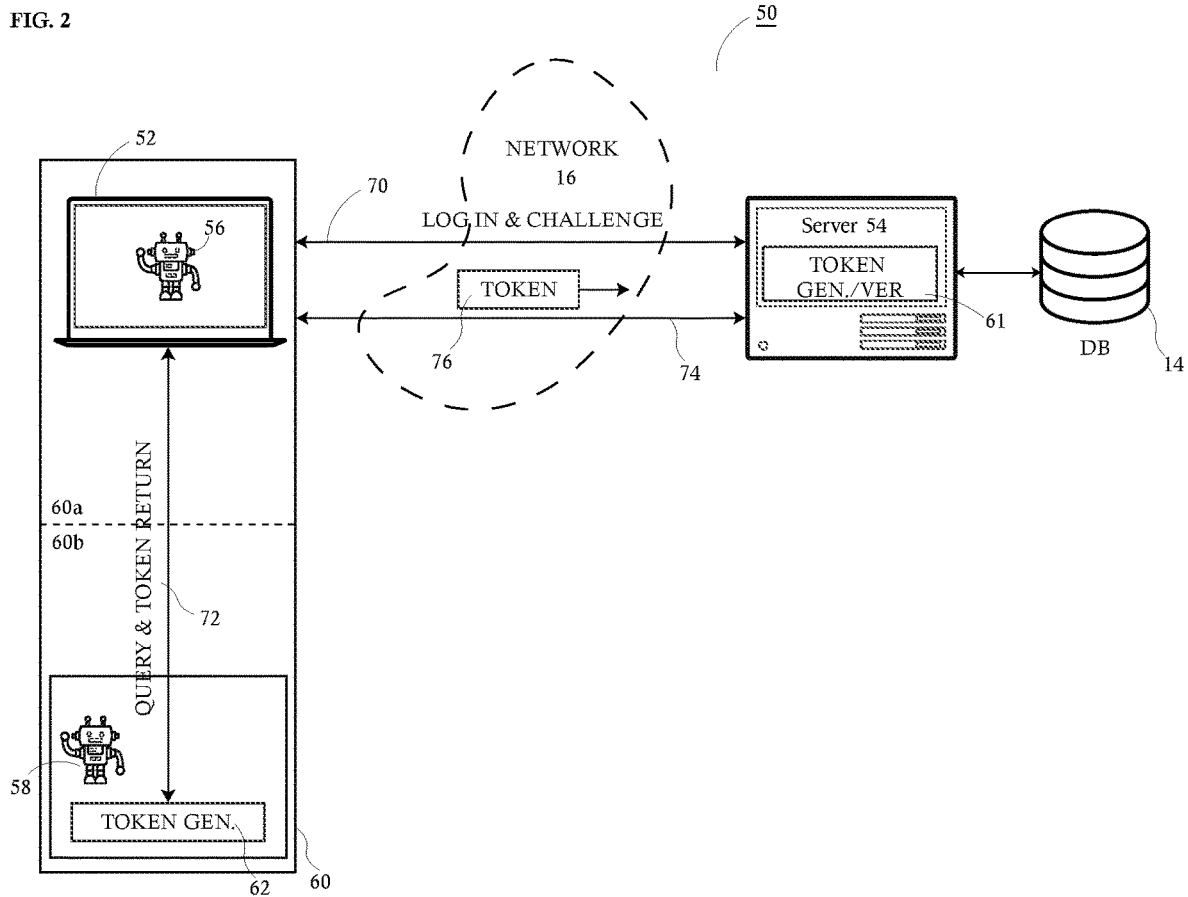

MULTI-FACTOR AUTHENTICATION SYSTEM AND METHOD

BACKGROUND TO THE INVENTION

This invention relates, in general, to a multi-factor authentication "MFA" and, particularly, but not exclusively to a two-factor "2FA" methodology and system employed in the context of robotic process automation.

SUMMARY OF THE PRIOR ART

Unfortunately, a strong account password alone is no longer consider sufficient to protect your personal data and digital accounts held across networked devices. Such passwords are created at initial registration to a user account and are referred to as single-factor authentication because account access merely requires entry of the password. Whilst the registered user is encouraged regularly to change the password to avoid the account being hacked through Malware or other cybercrime activity, updating of such passwords is generally infrequent because of the inconvenience caused with the process and the ability to select and remember suitable unique passwords for potentially many tens of different accounts owned by the user, including but not limited to bank accounts, on-line shops, social media accounts and subscription services, including car managements systems like "Mercedes me" offered by Mercedes-Benz®.

To provide for single-factor authentication in a modern business organisation, a capable and qualified human user is required to carry out daily tasks via a secure networked computer or terminal. For example, an 'Order Creation Clerk' receives sales order creation requests via emails from field agents. The order details (including any attachments) may be captured using an Excel® template macro sent to a dedicated mailbox held by the Clerk. The Clerk downloads the attachment and checks the content, then logs into a sales leger application using their unique credentials (i.e., a user id and password) and creates the order. This process is essentially a manual task.

2FA is a type of Identity and Access Management ("IAM") that attempts to ensure that legitimate users have access to appropriate digital resources. 2FA can be considered as a business security policy. Particularly, 2FA is a two-step authentication process used to access a website or online service and requires users to enter both their account password and then validate themselves through a secondary authentication method. Most commonly this secondary authentication method is realised by use of a one-time-use password "OTP" or single login code that is communicated to a secondary user device, such as a smartphone, that is both independent to a user's primary network interface device used [by the user or fraudster, as the case may be] to access the digital service, and which secondary device is pre-registered with the provider of the digital service. Consequently, 2FA is more secure than using single-factor authentication.

The terms "multi-factor authentication" and 2FA are frequently interchangeably used, albeit that the number of factors is multi-factor is not limited to two.

Pre-registration or "enrolment" of the secondary device typically includes download of some form of authenticator app (such as Google Authenticator®) by the user. Firstly, the user is required to complete the MFA registration process from their account portal by generating, for example, a QR code/MFA security token. Secondly, the user must download the appropriate authenticator app to the secondary device and then scan the generated QR code in, or enter the MFA security token at, the secondary device. This process ensures that the user's account and the secondary device are in synced and securely bound together.

Once MFA has been successfully set up, the authenticator app will create, for example, a six-digit code (or other code of appropriate length in number, text or alpha-numeric form) that refreshes approximately every thirty seconds. These [exemplary] six-digit codes are used to verify the user's identity on the app or platform they are attempting to log into and access.

Thereafter, during a first stage for any attempted instantiation of the service provided on the service platform, the platform and processing system (in general) makes initial use of the conventional user log-in credentials (and password) presented on the user interface (e.g. GUI) of the user's primary network interface (e.g. computer, tablet, smartphone or terminal device), whereafter the platform then requires a server-side initiated secondary challenge to the user through the user's network interface. During this second stage, the platform requires some form of valid verification entry (e.g., six-digit code, graphic sequence, correct question/answer (but not limited to)) to proceed, with this verification (in this example a six-digital code) sent to the user's registered secondary device. The user is tasked with entry of this secondary code through the user primary network interface. If the exemplary six-digit code is manually entered correctly within a limited time window, the user is authenticated, and the service platform opened for user access through the user's primary network interface. If an invalid code is entered or the code is entered after expiration of the limited time window, then access to the service platform (e.g. on-line application) is denied and the log-in stopped and/or the user account blocked.

After every session time out on the platform or after user log out, the MFA process must be started over to regain access to the service supported by the platform.

The benefit of using an authenticator app in 2FA is that the user must have access to their personal device when logging into the account. In practical terms, this means that if the user has the secondary device in their hands, it is practically impossible for the user account to be remotely accessed.

In overview, 2FA thus limits the ability of a cybercriminal to hack, even through use of just a brute-force attack, a user account remotely using only a password. 2FA requires that a user attempting to access a platform or service to authenticate themselves twice. The first mode of identification is almost always a password, whereas the second may be a one-time password sent to a user's email account or phone, a login code generated on an authentication app, or a physical security token. In all cases, the goal is to ensure that in order to access an account, the user must both know their password and have access to a trusted device [acting as a secondary authenticator, such as a personal smartphone].

The problem is that 2FA may be optional and requires human interaction. Furthermore, within a business, if 2FA is set as the security policy, there is no variation or latitude to move to a less secure single factor authentication procedure. Indeed, MFA/2FA presents a bottleneck for robotic process automation "RPA" implemented using a "bot" or digital worker.

As will be understood, a bot is a software application that is programmed to do certain tasks. Bots are automated, which means they run according to their instructions without a human user needing to start them up. Bots often imitate or replace a human user's behaviour. Typically, they do repetitive and frequently mundane tasks, and they can do such tasks much faster and more reliably than human users. For example, a considerable volume of internet traffic is bots scanning content, interacting with webpages, chatting with users, or looking for attack targets. If it's connected to the Internet, a bot will have an associated IP address.

Where possible, businesses and other organisations automate processes (previously executed by humans) by deploying RPA bots to fully automate the activities of the erstwhile human user/employee. In the example of recording a sales order from a travelling salesperson, an RPA bot could be tasked to access a centralised mailbox and download any attachment in an email from an identified sender, i.e., the salesperson. The RPA part therefore logs into the mailbox using a username and stored password, and then after completing these tasks the RPA bot logs out. A second RPA bot could be tasked with generating a purchase order based on the previously downloaded excel spreadsheet.

Unfortunately, an RPA bot can only handle single factor authentication (ID and Password), and has no ability to support or set itself up, i.e., enroll and onboard itself, to invoke MFA/2FA. In view of this shortcoming, a business or organisation will exempt bot accounts from MFA/2FA and practice/enable only single factor authentication in order to benefit from speed and reliability in processing in an environment containing tens, hundreds or thousands of RPA bots. This rejection of MFA/2FA increases the security risk around automation, as the processes are fully automated with no human interventions permissible. Consequently, if security is compromised in such automated processes, there is a real risk of misuse of information or theft from the business (which theft or misuse may go unnoticed for some time). Ideally, the same security policies should be equally applicable to a bot as they are to a human operative.

US 2020/0259827—Shaffer et al describes techniques directed generally to providing access control and identity verification for communications when initiating a communication from an entity to be verified. An initiating device initiates a communication to a receiving device on a communication channel, wherein the receiving device is configured to determine whether an identity associated with the initiating device is verified by a verification service. The initiating device verifies the identity through a verification service client application on the initiating device, and conveys, to the verification service over a verification channel, that the identity associated with the initiating device is verified, wherein the verification service conveys, to the receiving device over the verification channel, that the identity is verified. The communication then continues with the receiving device on the communication channel, wherein the receiving device manages the communication from the initiating device according to the identity being verified. In Shaffer, each and every log-in requires human interaction through a mobile device.

SUMMARY OF THE INVENTION

According to a first aspect of the invention there is provided a method of implementing multi-factor authentication "MFA" on a computer arranged to perform robotic process automation "RPA" using at least one task-executing bot instantiated on the computer, the method comprising: in response to a log-in request originating from the task-executing bot to a first server arranged to provide a gatekeeping function for at least one of access to data and storage of data content, receiving at the task-executing bot an MFA challenge from the first server; at the task-executing bot, in response to the MFA challenge, automatically acquiring a time-dependent MFA security token from a code generating algorithm associated with a pre-authenticated security bot perceived by the first server to be at a different address to the task-executing bot or computer, said pre-authenticated security bot having undergone a one-time synchronization to the first server at initial set-up of the task-executing bot thereby to support RPA, and wherein during the one-time set-up an association between said security bot and the task-executing bot is established such that the association validates, to the first server, the security bot as a secondary device within MFA to automate subsequent MFA to be a computer-based function within an MFA validation system comprising the task-executing bot and the security bot; and at the task-executing bot, automatically inserting the time-dependent MFA security token into a reply to the MFA challenge and sending the reply to the first server.

In more general terms, there is described herein a method of implementing multi-factor authentication "MFA" on a computer arranged to perform robotic process automation "RPA" using at least one task-executing bot instantiated on the computer, the method comprising: in response to a log-in request originating from the task-executing bot to a server arranged to provide a gatekeeping function for at least one of access to data and storage of data content, receiving at the task-executing bot an MFA challenge from the server, at the task-executing bot, in response to the MFA challenge, automatically acquiring a time-dependent MFA security token from a code generating algorithm associated with a pre-authenticated security bot perceived by the server to be at a different address to the task-executing bot or computer, and at the task-executing bot, automatically inserting the time-dependent MFA security token into a reply to the MFA challenge and sending the reply to the server.

In slightly more detailed overview, an MFA/2FA system includes a computer tasked with simultaneously implementing one and generally many robotic process automation "RPA" functions. To achieve secure log-in to a server providing a gatekeeping function to data required for or deliverable by the RPA functions, a security bot having an independent address is initially authenticated as a valid secondary device associated to a different address of a specific task-executing bot arranged to perform a specific RPA function. A token generating algorithm providing synchronised tokens relative to the server is linked, during a set-up procedure, to the address of the security bot such that, when the task-executing bot is challenged by the server during log-in, a token can be obtained by the task-executing bot from the token generating algorithm. The task-executing bot is arranged to supply, i.e., insert, the token as a reply to the server to validate the computer's credentials and open a secure session authenticated by MFA/2FA.

The method of various embodiments further comprises: at the server, running a mirror copy of the code generating algorithm arranged to generate time-varying reference tokens; and in response to receipt of the time-dependent MFA security token, establishing a secure session between the task-executing bot and the server in the event that the time-dependent MFA security token correlates with a time-varying reference token current at the time of generating the MFA challenge, else denying the log-in request from the MFA challenge.

The computer may simultaneously executes a multiplicity of RPA functions each performed by an uniquely assigned task-executing bot instantiated on the computer, The security bot may be instantiated on a server remotely located from the computer.

In one or more embodiments, the method may further comprise: at the computer, identifying and selecting an address of the security bot from a database of unique addresses for a plurality of candidate security bots; during enrolment for pre-authentication of the security bot, presenting the unique address of the selected security bot to the server, wherein the unique address of the selected security bot is a different IP address to the address of the task-executing bot and the computer.

The computer may be arranged to spoof the unique address of the selected security bot during enrolment thereby obscuring the IP address of the computer and task-executing bot from the server. Selection of the security bot may itself be an automated task.

In another embodiment, during enrolment for pre-authentication of the security bot, the method includes contacting the security bot directly from the server using a user-nominated address.

In another aspect of the invention there is provided a networked computer system comprising distributed processing intelligence arranged to implement the method of any of claims 1 to 8.

In a further aspect of the invention there is provided a keyless entry system including: a key fob or smartphone registered as an MFA device; and system intelligence coupled to a lock that can be opened to locked subject to provision of a time synchronised MFA token, wherein the keyless entry system is configured to implement the process or any of claims 1 to 10. The system intelligence may be realised by processing intelligence in a vehicle and the task-executing bot is located with processing functionality in one of a key fob and a smartphone. Correspondingly, depending upon which device is used as the key, the code generating algorithm may be located with one of a key fob and a smartphone.

The present invention thus provides a software product that can provide MFA/2FA numerical codes (or other suitable tokens) in an automated manner to task-executing bots designed to support RPA functions. When a selected task-executing is faced with a MFA/2FA challenge, the software product acts as a second device (potentially deployed on a physically and geologically separate secure server).

Once registered and linked, every time the task-executing bot seeks to log into any application and a 2FA challenge window is presented to the task-executing bot at the computer, the task-executing bot will make an automated request to the software product for supply of a synchronised and time-valid token. The software product verifies the identity of the task-executing bot by passing on token in real time (without any human intervention) by inserting this time-unique token into the numerical 2FA challenge window.

Advantageously, the present invention describes a system and process in which RPA bots are able to support MFA/2FA, thus providing enhanced security whilst maintaining robust and efficient processing of copious data related to relatively banal tasks that are too mundane for long-term human engagement. The system and process operate independently of human interaction.

The process of the invention can be applied to any software that makes use of BOT processing for RPA functions and for applications/access requiring MFA/2FA for log-in. The relation between the task-executing bot and the security bot/software product is instantaneous and stateless. This invention allows business and organisations to be fully compliant with de facto 2FA security policies and any internal organizational policies, such as access and log-in procedures and/or general security. This gives organisations which employ RPA or have Digital Workforce significantly greater security and protection against potential cybercrime activities, thereby permitting businesses to make use of 2FA bot operation on a 24/7 basis in the knowledge that the security protocols are in place and cannot be compromised.

Various aspects and embodiments of the invention as outlined in the appended claims and the following description can be implemented as a hardware solution and/or as software, including downloadable code or a web-based app or as an embedded system.

BRIEF DESCRIPTION OF THE DRAWINGS

Exemplary embodiments of the present invention will now be described with reference to the accompanying drawings in which:

FIG. 1 is a schematic representation of a prior art MFA system showing interactions with time; and FIG. 2 is a schematic representation of an MFA system and connection methodology according to a preferred embodiment of the present invention.

DETAILED DESCRIPTION OF A PREFERRED EMBODIMENT

Referring briefly to FIG. 1 which is a schematic representation of a prior art MFA system 10 showing interactions with time.

A client interface, provided on a computer or the like 10, permits a log-in procedure to an application or service on a platform, such as supported by a server 12 connected to a database 14. The application or service can take many forms, including a banking facility, an on-line purchase event or some other management function. For the sake of brevity, the log-in procedure described in the context of a registered and pre-established account that has been previously set up by a user. Account information and related server-side data may be stored in the database 14 and is accessible via the server (acting as a gatekeeper). Connection between computer 10 and the server 12 may be over any suitable network 16, such as WAN which may include wired and/or wireless access readily known to the skilled addressee. A secondary device 18, such as a smartphone, is synchronised to the server and client interface through a conventional MFA/2FA enrolment scheme, as described previously and as is readily known.

The user-initiated log-in procedure, in wishing to gain access to data stored on the database 14, initiates a handshake 20 with the server 20, which handshake sends the log-in request (typically in the form of an account name and associated password), and then in return receives a challenge for 2FA authentication. The challenge causes the user to be aware that a security token, such as the code, must be supplied, via the user interface, to authenticate the user and to instantiate access to the requested service on the server. Usually, the challenge will advise the user at that the token will be sent to is available at the pre-registered and/or synchronized secondary device 18 that is associated with the computer 10. Contemporaneously with the challenge, the secondary device is contacted and the token supplied. In one prior art arrangement, the server sends the authenticating token to the secondary device 18 in a message, such as a text message, to cause the secondary device to display the token 24 on its GUI 22. Since the secondary device 18 is located proximately to the user, the user then visually pulls the token from the display, enters the token into the GUI 22 of the computer 10 and thus causes an authentication code 26 to be returned to the server 12 over a network connection. At this point, cross-referencing the returned authentication code at the server justifies establishment of an interactive data session 28. This arrangement is, however, unable to support implementation in an RPA bot environment.

FIG. 2 is a schematic representation of an MFA system 50 and connection methodology according to a preferred embodiment of the present invention.

A server 12 and connected database 14 are configured to support the provision of service applications, such a bank account, a financial transaction, business detail processing and/or a membership, including social media platforms. These are merely examples of application that may be bot-based. Other applications where MFA/2FA is desirable will thus be readily appreciated in view genus established by these typical internet-based interactive services.

1. Set-Up and Synchronization

In contrast with the prior art approach, FIG. 2 shows an MFA/2FA system 50 supporting an RPA bot implemented process.

A computer 52 provides, initially, a user interface that permits the entry of a registration request to a server 54. The registration request is generally consistent with existing bot-based registration processes in that the address a task-executing bot 56 is communicated to the server and a passcode also set up. This is generally a user-centric task since it requires some human interaction/input to implement the registration process and set up the processing functions performed by the task-executing 56. As part of the registration request process, the server 54 initiates enrolment of the task-executing bot 56 into an MFA/2FA security scheme. In this respect, an address of the task-executing bot 56 is sent to the server with a log-in password. Entry of this address, unique to the task-executing bot 56, is typically a manually-controlled process, although automation is also feasible based on an established list of addresses and passwords for suitably configured task-oriented bots. The registration request from the computer/task-executing bot will further include a link or other identification to a nominally distinct security bot 58 having its own unique address.

In response, the registration request, the server communicates a QR code or other suitable enrolment code that is used to establish an MFA/2FA relationship with the nominally distinct security bot 58.

It will be understood that the task-executing bot 56 and security bot 58 are essentially code modules executed by processing intelligence. The processing intelligence will include stored program code, memory and a controller that implements the program code to execute the function(s).

To achieve MFA credibility the task-executing 56 and the security bot 58 should be on separate machines 60a, 60b in communication with one another over a LAN or other local or wide area network, including the internet.

The computer 52 functions to establish a relationship between the task-executing bot 56, the security bot and the server 54 that supports the application or data to which the task-executing bot 56 requires access in order to permit the task-executing bit 56 to perform RPA.

There are two alternative paths by which the security bot 58 is enrolled with the server 54 and, particularly, how the unique address of the security bot 58 is recorded by the server 54 as associated with the task-executing bot 56.

The first direct enrolment process is for the server to establish, initially, a direct point-to-point session to the security bot 58 and for the server to provide directly, during a communication session and on a point-to-point basis, a QR code or other suitable enrolment code (collective the "MFA enrolment code") to the security bot so that a user at a suitable computer interface of the security bot (or if automated the related local processor for the security bot) can scan or enter the MFA enrolment code into the security bot 58. The security bot 58 validates receipt of the MFA enrolment code by replying (directly) to the server 54, which reply includes its unique address and an cross reference to either or both the task-executing bot and/or the MFA enrolment code to complete the logical relationship circuit. The reply can be direct to the server or indirect via the computer 52 provided that the unique address of the security bot is seen to originate from the security bot 58 from the perspective of the server 54. The reply from the security bot therefore establishes the association, in the eyes of the server 54, to the task-executing bot and thus validates the security bot 58 as a secondary device within the MFA/2FA security process. The provision of the unique address of the security bot 58 to the server also sees the unique address of the security bot 58 supplied to and stored by the task-executing bot; this may be achieved by simple communication and messaging between the task-executing bot 56 and the security bot 58 potentially all controlled and overseen by functional programming in the computer 52. This first enrolment approach avoids seeing any material change in which the 2FA process is administered by existing servers and thus is the preferred process.

The second approach is for the enrolment of the secondary device, i.e. the security bot 58, to be controlled via the computer 52. This is an indirect approach. In this instance, the computer 52 operates to spoof the server 54 into believing that it is the security bot 58 (rather than the address of the task-executing bot). This results in all the registration and enrolment processes being conducted via the computer 52 or more usually a human administrator providing data input through a user interface at the computer. Again, the data entry process may be automated at the computer subject to the computer having access to a database of security bot addresses and being able to assign security bots and record addresses for those security bots to specific task-executing bots. This second indirect approach avoids a direct connection/session being established between the server 54 and the security bot 58. In more detail, in response to the initial registration request from the computer 52 for access to the secure service supported by the server 54, the server again sends the MFA enrolment code, but this time the server is fooled into sending this MFA enrolment code to the spoofed security bot address presented at/by the computer 52. The computer 52 then either operates an information exchange during a handshake with the security bot 58 to acquire the unique address of that security bot or otherwise operates to return the unique address of the selected security bot (together with any necessary link to the MFA enrolment code) to the server 54. Again, the effect of the enrolment process is to establish the association, in the eyes of the server 54, between the security bot 58 and the task-executing bot and thus validates the security bot 58 as a secondary device within the MFA/2FA security process controlled by the server.

Regardless of whether the security bot 58 is validated with the server 54 through either the first direct or second indirect registration/enrolment processes, the server provides a token generation and verification algorithm 61 to the address of the security bot. These server-side functions are clearly related, although the code instances may be run independently within the server hardware. The provision of this token generating/verifier algorithm 61 may occur, as the case may be, during messaging in the set-up procedure or afterwards. The token generating algorithm 61 is thus run at the server, with a complementary token generator 62 run at the security bot 58. Tokens (i.e. security codes) generated by the two instances of the token generating algorithms are fixed in time synchronicity between the server and the security bot associated with the specific task-executing bot.

The initial enrolment is a one-time only process because, once delivery of a synchronized token generating algorithm has taken place nominally to a security bot considered independent (i.e. having a different address to) to the task-executing RPA bot, the subsequent challenge, supply and verified correlation of a synchronized time critical token supplied between the computer 52 and the server 54 establishes the closed loop authentication between the interacting logic and components in the server [that provides the service or data access] and the computer 52 running one or more RPA functions.

2. Log-In after MFA/2FA Enrolment

The task-executing bot 52 initiates log-in during a registration handshake 70 by communicating, through a website page, its password and registered address to the server 54. The server replies with an MFA/2FA challenge to the computer 52 and its task-executing bot. The task-executing bot 52 interprets the challenge and its requirement for data entry by actively consulting, during a local handshake 72, the security bot 58 to acquire the current, time-critical token from the token generating algorithm 62 running locally and associated with the unique address of the linked security bot 58. In fact, since the response to the server to the MFA/2FA challenge is simply entry of the appropriate time synchronized token, it is only the associated token generating algorithm that is relevant to validation of the task-executing bot by the server to permit access to the secure content or applications stored in the database 14 linked to the server. The acquired task time synchronized token 76 is inserted, by the task-executing bot 56, into a response to challenge message that is communicated across the network 16 to the server. The server, upon establishing correlation between the time synchronized token 76 and its own reference token generated at the point of challenge, provides the task-executing bot 56 with access privileges to allow the task-executing bot 56 to perform its assigned RPA function.

Implementing the embodiments of the present invention mean that, when a task-executing bot 56 logs into a remote server 54, an MFA/2FA process is invoked that sees the task-executing bot 56 validated since the server timely receives a confirmatory token 74 ostensibly generated by a secondary device (i.e., the security bot 58) that has a pre-established local association with the task-executing bot 56. The necessary system emphasis and reference to the secondary device is thus met by a two-stage log-in process that is local and controlled through the client-side computer. A secure session is then established in which RPA (e.g., order creation in the example provided herein) is achieved.

The process explained herein and as particularly reflected in relation to FIG. 2 can be extended to include an architecture in which, for example, a discrete and independent SharePoint™ server (although not shown in FIG. 2) or some other functional server interacts with bot 56 and requests generation of an MFA token using bot 56 as an intermediary. In this instance, the exemplary SharePoint server running a discrete function will be a separate physical entity connected to bot 56 via a suitable network connection. Bot 56 will still interact with the token generator 62 to acquire the necessary token for access to server 54, and functions automatically to provide this token to the SharePoint server to permit final access and functional interaction.

To support multiple other processes, bot 56 may have many-to-one connectivity in order to serve a multiplicity of functions running on independent server systems. In this respect, different MFA authentication tokens are provided to each of these multiple servers to instantiate their respective functions and data access requirements/interactions.

Further Exemplary Application of MFA Technology

In terms of another practical application for this bot-based MFA process (beyond a server-based network utilising the MFA approach of the present invention), the above process lends itself to fob-based keyless entry systems, such as used with cars, vehicles and other door entry systems. At the moment, keyless entry procedures can be compromised through frequency grabbing and cloning processes. To avoid this, an embodiment of the invention would firstly have a supplied keyless entry/exit open-lock fob register for MFA. In essence, bot 56 would be realised by an intelligent fob and the fob would, as described above, register with a remote/ appropriate token generator 58.

In terms of the server 54, this would either be installed/ fully embedded in the vehicle or otherwise the functionality of the server 54 would be distributed between the vehicle and a remote server. The distributed function may be desirable for a fleet-based environment or a vehicle manufacturer.

The process requires that a supplied fob is a registered and authenticated fob. This process would make use of a unique identifier or address (such as a MAC address) of the fob. Botmatic™, i.e., bot 58, would be realised by an app on a smartphone associated with the vehicle's keeper or user; this app can be downloaded and subject to registration.

The fob is firstly registered with the smartphone (or computer system if, for example, central processing is desired) to gain access to the token generator 58. Subsequently, upon attempting keyless entry by the fob to the vehicle, the fob is challenged by the vehicle's system intelligence. This challenge requires return of the correct token in an MFA approach. The fob interacts with the smartphone (or computer system as the case may be) to obtain the synchronised and correct token and then returns this over a short-range wireless link to the vehicle's server/ intelligence. Upon resolving commonality in the generated token, the vehicles intelligence unlocks the vehicle.

The system can, of course, be entirely embedded in the fob and processing intelligence of the vehicle so that the user's phone acts as the interface and keyless entry/exit device. With an embedded system, if the fob is lost, then the user's registered smartphone can be used to revoke the MFA, thereby disabling the keyless entry system to the vehicle.

The MFA challenge to authenticate the key fob can be interactive (e.g., through using a smartphone) or automatic in sense that the MFA token is obtained automatically from the token generator 58. The system's realisation is therefore extremely flexible.

Setting up a keyless system in this way using the described MFA approach validates/authenticates the fob every time that it is actuated, e.g., clicked.

Unless specific arrangements are mutually exclusive with one another, the various embodiments described herein can be combined to enhance system functionality and/or to produce complementary functions or system that support the effective identification of user-perceivable similarities and dissimilarities. Such combinations will be readily appreciated by the skilled addressee given the totality of the foregoing description. Likewise, aspects of the preferred embodiments may be implemented in standalone arrangements where more limited functional arrangements are appropriate. Indeed, it will be understood that unless features in the particular preferred embodiments are expressly identified as incompatible with one another or the surrounding context implies that they are mutually exclusive and not readily combinable in a complementary and/or supportive sense, the totality of this disclosure contemplates and envisions that specific features of those complementary embodiments can be selectively combined to provide one or more comprehensive, but slightly different, technical solutions. In terms of the suggested process flows of the accompanying drawings, it may be that these can be varied in terms of the precise points of execution for steps within the process so long as the overall effect or re-ordering achieves the same objective end results or important intermediate results that allow advancement to the next logical step. The flow processes are therefore logical in nature rather than absolute. Indeed, it should be appreciated that any block diagrams herein represent conceptual views of illustrative circuitry embodying the principles of the invention. Similarly, it should be appreciated that any flow charts, flow diagrams, state transition diagrams, pseudo code, and the like represent various processes which may be substantially represented in computer readable medium and so executed by a computer or processor, whether or not such computer or processor is explicitly shown.

The functions of the various elements shown in the figure including any functional blocks labelled as "algorithms" or the like may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non-volatile storage. Other hardware, conventional or custom, may also be included, with the particular technique being selectable by the implementer as more specifically understood from the context.

Aspects of the present invention may be provided in a downloadable form or otherwise on a computer readable medium, such as a CD ROM, that contains program code that, when instantiated, executes the link embedding functionality at the computer the like.

It will, of course, be appreciated that the above description has been given by way of example only and that modifications in detail may be made within the scope of the present invention. For example, RPA is not limited to order creation applications but can relate to any robotic process automation of a commercial or personal task requiring data entry, content interpretation and/or general data processing.

The invention claimed is:

1. A computer-implemented method of implementing multi-factor authentication (MFA) on a computer configured to perform robotic process automation (RPA) using at least one task-executing bot instantiated on the computer, the method comprising:

in response to a log-in request originating from the task-executing bot to a first server configured to provide a gatekeeping function for at least one of access to data and storage of data content, receiving at the task-executing bot an MFA challenge from the first server;

at the task-executing bot, in response to the MFA challenge, acquiring a time-dependent MFA security token from a code generating algorithm associated with a pre-authenticated security bot perceived by the first server to be at a different address to the task-executing bot, the pre-authenticated security bot having undergone a one-time synchronization to the first server at initial set-up of the task-executing bot thereby to support RPA, and wherein during the one-time set-up an association between the pre-authenticated security bot and the task-executing bot is established such that the association validates, to the first server, the pre-authenticated security bot as a secondary device within MFA to automate subsequent MFA to be a computer-based function within an MFA validation system comprising the task-executing bot and the pre-authenticated security bot; and at the task-executing bot, inserting the time-dependent MFA security token into a reply to the MFA challenge and sending the reply to the first server.

2. The method of implementing MFA according to claim 1, the method further comprising:

at the first server, running a mirror copy of the code generating algorithm configured to generate time-varying reference tokens; and in response to receipt of the time-dependent MFA security token, establishing a secure session between the task-executing bot and the first server in the event that the time-dependent MFA security token correlates with a time-varying reference token current at the time of generating the MFA challenge, else denying the log-in request from the MFA challenge.

3. The computer-implemented method of implementing MFA according to claim 2, wherein the computer simultaneously executes a multiplicity of RPA functions each performed by a uniquely assigned task-executing bot instantiated on the computer.

4. The computer-implemented method of implementing MFA according to claim 3, wherein the first server is configured within a vehicle and wherein the task-executing bot is located with processing functionality in one of a key fob and a smartphone.

5. The computer-implemented method of implementing MFA according to claim 2, further comprising:

at the computer, identifying and selecting an address of the security bot to be pre-authenticated from a database of unique addresses for a plurality of candidate security bots; and during enrolment for pre-authentication of the security bot to be pre-authenticated, presenting the unique address of the selected security bot to be pre-authenticated to the first server, wherein the unique address of the selected security bot to be pre-authenticated is a different IP address than the address of the task-executing bot and the computer.

6. The computer-implemented method of implementing MFA according to claim 1, wherein the computer simultaneously executes a multiplicity of RPA functions each performed by a uniquely assigned task-executing bot instantiated on the computer.

7. The computer-implemented method of implementing MFA according to claim 1, wherein a security bot to be pre-authenticated is instantiated on a second server that is remotely located from the computer.

8. The computer-implemented method of implementing MFA according to claim 1, further comprising:
   at the computer, identifying and selecting an address of a security bot to be pre-authenticated from a database of unique addresses for a plurality of candidate security bots; and
   during enrolment for pre-authentication of the identified and selected security bot, presenting the unique address of the identified and selected security bot to the first server, wherein the unique address of the identified and selected security bot is a different IP address than the address of the task-executing bot and the computer.

9. The computer-implemented method of implementing MFA according to claim 8, further comprising the computer spoofing the unique address of the selected security bot to be pre-authenticated during enrolment, thereby obscuring the IP address of the computer and task-executing bot from the first server.

10. The computer-implemented method of implementing MFA according to claim 8, wherein selection of the address of the security bot to be pre-authenticated is an automated task.

11. The computer-implemented method of implementing MFA according to claim 8, wherein the method further includes:
   during enrolment for pre-authentication of the security bot to be pre-authenticated, contacting the security bot to be pre-authenticated directly from the first server using a user-nominated address.

12. The computer-implemented method of implementing MFA according to claim 1, wherein the first server is configured within a vehicle and wherein the task-executing bot is located with processing functionality in one of a key fob and a smartphone.

13. The computer-implemented method of implementing MFA according to claim 12, wherein the code generating algorithm is located within one of a key fob and a smartphone.

14. A networked computer system comprising distributed processing intelligence configured to implement the computer-implemented method of claim 1.

15. A keyless entry system including:
   a key fob or smartphone registered as a multi-factor authentication (MFA) device and configured to perform robotic process automation (RPA) using at least one task-executing bot instantiated in the key fob or smartphone; and
   system intelligence coupled to a lock that can be selectively locked or unlocked upon being provided with a time-dependent MFA security token, wherein the keyless entry system is configured to:
   in response to a log-in request, originating from the task-executing bot to the system intelligence coupled to the lock, to provide a gatekeeping function for at least one of access to data and storage of data content, receiving at the task-executing bot an MFA challenge from the system intelligence;
   at the task-executing bot and in response to the MFA challenge, acquiring the time-dependent MFA security token from a code generating algorithm associated with a pre-authenticated security bot perceived by the system intelligence to be at a different address than the task-executing bot, the pre-authenticated security bot having undergone a one-time synchronization to the system intelligence at initial set-up of the task-executing bot thereby to support RPA, and wherein during the one-time set-up an association between the pre-authenticated security bot and the task-executing bot is established such that the association validates, to the system intelligence, the pre-authenticated security bot as a secondary device within MFA to automate subsequent MFA to be a computer-based function within an MFA validation system comprising the task-executing bot and the pre-authenticated security bot;
   at the task-executing bot, inserting the time-dependent MFA security token into a reply to the MFA challenge, sending the reply to the system intelligence to enable the lock to selectively lock or unlock.

16. The method of implementing MFA according to claim 15, the method further comprising:
   at the first server, running a mirror copy of the code generating algorithm configured to generate time-varying reference tokens; and
   in response to receipt of the time-dependent MFA security token, establishing a secure session between the task-executing bot and the first server in the event that the time-dependent MFA security token correlates with a time-varying reference token current at the time of generating the MFA challenge, else denying the log-in request from the MFA challenge.

17. A computer-implemented method of implementing multi-factor authentication (MFA) on a computer configured to perform robotic process automation (RPA) using a task-executing bot instantiated on the computer, the method comprising:
   in response to a log-in request originating from the task-executing bot to a first server configured to provide a gatekeeping function for at least one of access to data and storage of data content required by said task-executing bot to execute a specific task, receiving at the task-executing bot an MFA challenge from the first server;
   at the task-executing bot, in response to the MFA challenge, acquiring a time-dependent MFA security token from a code generating algorithm associated with an independent pre-authenticated security bot perceived by the first server to be at a different address to the task-executing bot, the pre-authenticated security bot having undergone a one-time synchronization to the first server at initial set-up of the task-executing bot thereby to support RPA, and wherein during the one-time set-up an association between the pre-authenticated security bot and the task-executing bot is established such that the association validates, to the first server, the pre-authenticated security bot as a secondary device within MFA to automate subsequent MFA to be a computer-based function within an MFA validation system comprising the task-executing bot and the pre-authenticated security bot and wherein the pre-authenticated security bot is not involved with execution of the specific task other than to authenticate the task-executing bot; and
   at the task-executing bot, inserting the time-dependent MFA security token, acquired from the code generating algorithm associated with the pre-authenticated security bot, into a reply to the MFA challenge and sending the reply to the first server in order to permit the task-executing bot to receive data from the first server and to store data content as required for execution of the specific task.

* * * * *